US012663994B2

(12) United States Patent
Waterman et al.

(10) Patent No.: US 12,663,994 B2
(45) Date of Patent: Jun. 23, 2026

(54) SUPPORTING MULTIPLE VECTOR LENGTHS WITH CONFIGURABLE VECTOR REGISTER FILE

(71) Applicant: SiFive, Inc., San Mateo, CA (US)

(72) Inventors: Andrew Waterman, Berkeley, CA (US); Krste Asanovic, Oakland, CA (US)

(73) Assignee: SiFive, Inc., Santa Clara, CA (US)

( * ) Notice: Subject to any disclaimer, the term of this patent is extended or adjusted under 35 U.S.C. 154(b) by 69 days.

(21) Appl. No.: 18/345,007

(22) Filed: Jun. 30, 2023

(65) Prior Publication Data

US 2024/0020124 A1 Jan. 18, 2024

Related U.S. Application Data

(60) Provisional application No. 63/388,627, filed on Jul. 12, 2022.

(51) Int. Cl.
G06F 9/30 (2018.01)

(52) U.S. Cl.
CPC ...... G06F 9/30101 (2013.01); G06F 9/30112 (2013.01); G06F 9/3012 (2013.01); G06F 9/30189 (2013.01)

(58) Field of Classification Search
CPC ............. G06F 9/30112; G06F 9/30189; G06F 9/30101; G06F 9/30109
See application file for complete search history.

(56) References Cited

U.S. PATENT DOCUMENTS

| | | | | |
|---|---|---|---|---|
| 5,513,366 | A * | 4/1996 | Agarwal | G06F 9/30109 712/7 |
| 6,343,356 | B1 * | 1/2002 | Pechanek | G06F 9/30036 712/210 |
| 2007/0143574 | A1 * | 6/2007 | Bonebakker | G06F 9/3885 712/2 |
| 2010/0115233 | A1 * | 5/2010 | Brewer | G06F 9/3887 712/7 |
| 2010/0115234 | A1 * | 5/2010 | Faanes | G06F 15/8053 712/7 |
| 2011/0145543 | A1 * | 6/2011 | Damron | G06F 9/30189 712/3 |
| 2011/0320765 | A1 * | 12/2011 | Karkhanis | G06F 9/30109 712/7 |

(Continued)

*Primary Examiner* — Keith E Vicary

(74) *Attorney, Agent, or Firm* — Kilpatrick Townsend & Stockton LLP

(57) ABSTRACT

Systems and methods are disclosed for supporting multiple vector lengths with a configurable vector register file. For example, an integrated circuit (e.g., a processor) includes a data store configured to store a vector length parameter; a processor core including a vector register, wherein the processor core is configured to: while a first value of the vector length parameter is stored in the data store, store a single architectural register of an instruction set architecture in the vector register; and, while a second value of the vector length parameter is stored in the data store, store multiple architectural registers of the instruction set architecture in respective disjoint portions of the vector register. For example, the integrated circuit may be used to emulate a processor with smaller vector registers for the purpose of migrating a thread to a processor core of the integrated circuit for continued execution.

16 Claims, 9 Drawing Sheets

800

(56)                    References Cited

U.S. PATENT DOCUMENTS

| | | | |
|---|---|---|---|
| 2013/0159665 A1* | 6/2013 | Kashyap | G06F 9/3001 |
| | | | 712/E9.023 |
| 2015/0006865 A1* | 1/2015 | Toll | G06F 9/30109 |
| | | | 712/229 |
| 2015/0019896 A1* | 1/2015 | Anderson | G06F 9/30112 |
| | | | 713/324 |
| 2016/0224514 A1* | 8/2016 | Moudgill | G06F 9/30036 |
| 2017/0168820 A1* | 6/2017 | Eyole | G06F 9/30036 |
| 2017/0192789 A1* | 7/2017 | Malladi | G06F 9/30038 |
| 2017/0220499 A1* | 8/2017 | Gray | G06F 13/36 |
| 2019/0196823 A1* | 6/2019 | Madduri | G06F 9/30145 |
| 2021/0117192 A1* | 4/2021 | Robson | G06F 9/3012 |
| 2022/0147351 A1* | 5/2022 | Luo | G06F 9/223 |
| 2023/0273792 A1* | 8/2023 | Stephens | G06F 9/38873 |
| | | | 712/208 |

* cited by examiner

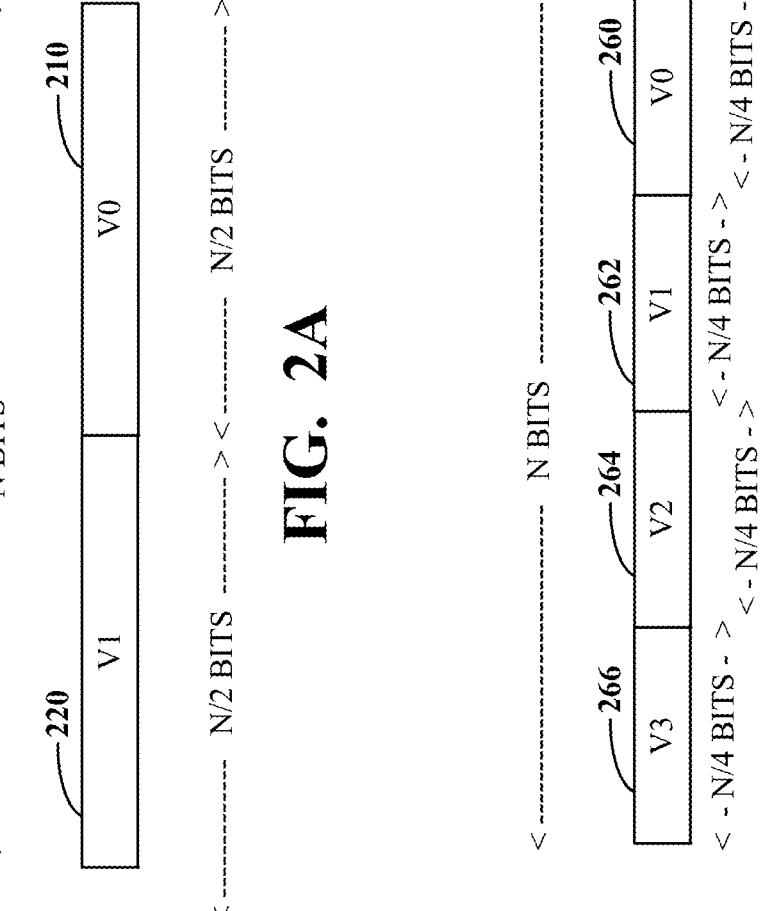
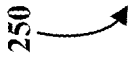
FIG. 2A
FIG. 2B

400

600

610

CHANGE A CONFIGURATION OF A PROCESSOR CORE INCLUDING A VECTOR REGISTER FROM A FIRST MODE WHERE A SINGLE ARCHITECTURAL REGISTER OF AN INSTRUCTION SET ARCHITECTURE IS STORED IN THE VECTOR REGISTER TO A SECOND MODE WHERE MULTIPLE ARCHITECTURAL REGISTERS OF THE INSTRUCTION SET ARCHITECTURE ARE STORED IN THE VECTOR REGISTER

620

LOAD A STATE OF A THREAD THAT HAS RUN ON A SECOND PROCESSOR CORE WITH A SMALLER MAXIMUM VECTOR LENGTH THAN THE PROCESSOR CORE INTO REGISTERS OF THE PROCESSOR CORE, INCLUDING THE VECTOR REGISTER

630

CONTINUE EXECUTION OF THREAD USING THE PROCESSOR CORE IN THE SECOND MODE TO EMULATE A MAXIMUM VECTOR LENGTH EQUAL TO THE MAXIMUM VECTOR LENGTH OF THE SECOND PROCESSOR CORE

710

PARTITION THE VECTOR REGISTER INTO K PORTIONS THAT EACH STORE A RESPECTIVE ARCHITECTURAL REGISTER OF THE INSTRUCTION SET ARCHITECTURE

720

SHUT DOWN A FIRST SUBSET OF VECTOR REGISTERS IN A VECTOR REGISTER FILE OF THE PROCESSOR CORE WHILE THE ARCHITECTURAL VECTOR REGISTERS ARE PACKED INTO A SECOND SUBSET OF VECTOR REGISTERS IN THE VECTOR REGISTER FILE THAT IS DISJOINT FROM THE FIRST SUBSET

*810*

SELECTIVELY ROUTE DATA OF AN ARCHITECTURAL REGISTER STORED IN A FIRST PORTION OF THE VECTOR REGISTER TO ONE OF MULTIPLE DISJOINT PORTIONS OF AN OPERAND BUFFER IN A VECTOR EXECUTION UNIT

*820*

SELECTIVELY ROUTE DATA OF A PORTION OF AN OPERAND BUFFER IN A VECTOR EXECUTION UNIT TO ONE OF MULTIPLE DISJOINT PORTIONS OF THE VECTOR REGISTER CORRESPONDING TO A RESPECTIVE ARCHITECTURAL REGISTER STORED IN THE VECTOR REGISTER

PERFORM AN OPERATION ON ELEMENTS OF THE MULTIPLE
ARCHITECTURAL REGISTERS STORED IN THE VECTOR REGISTER IN
PARALLEL USING A SINGLE TRANSFER OF DATA FROM THE
VECTOR REGISTER TO A VECTOR EXECUTION UNIT VIA DATA
PATH OF WIDTH N BITS

SUPPORTING MULTIPLE VECTOR LENGTHS WITH CONFIGURABLE VECTOR REGISTER FILE

CROSS-REFERENCE TO RELATED APPLICATION(S)

This application claims priority to and the benefit of U.S. Provisional Patent Application Ser. No. 63/388,627, filed Jul. 12, 2022, the entire disclosure of which is hereby incorporated by reference.

TECHNICAL FIELD

This disclosure relates to supporting multiple vector lengths with a configurable vector register file.

BACKGROUND

Processors may be configured to execute vector instructions that operate on arguments with one or more elements. An instruction set architecture supporting vector instructions may provide for set of architectural vector registers. The length in bits of the architectural vector registers is a design parameter that may vary between processors. The architectural vector registers may be implemented by a processor using a vector register file that includes a set of physical vector registers of length equal to the maximum architectural vector length supported by the processor. This maximum architectural vector length supported by a processor may also inform the sizing of vector execution units in the processor and/or the widths of datapaths within the processor for moving data in and out of the vector register file. Some instruction set architectures, such as RISC-V with vector extension, support grouping of architectural vector registers to form larger arguments for vector instructions from multiple physical vector registers, which may be executed over multiple cycles using multiple vector micro-ops.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 2A is a memory map diagram of an example of a vector register configured to store two architectural vector registers.

FIG. 2B is a memory map diagram of an example of a vector register configured to store four architectural vector registers.

FIG. 6 is a flow chart of an example of a process for using support for multiple vector lengths with a configurable vector register file to emulate a processor core with a smaller maximum vector length and enable migration of a running thread from a core with a smaller maximum vector length.

FIG. 7 is a flow chart of an example of a process for changing a mode of processor core to use a smaller maximum vector length than the native maximum vector length of the processor core.

FIG. 8 is a flow chart of an example of a process for selectively routing between different portions of a datapath to enable various combinations of architectural vector registers to be paired for execution even when they occupy different portions of their vector registers.

DETAILED DESCRIPTION

Overview

Figure 1:
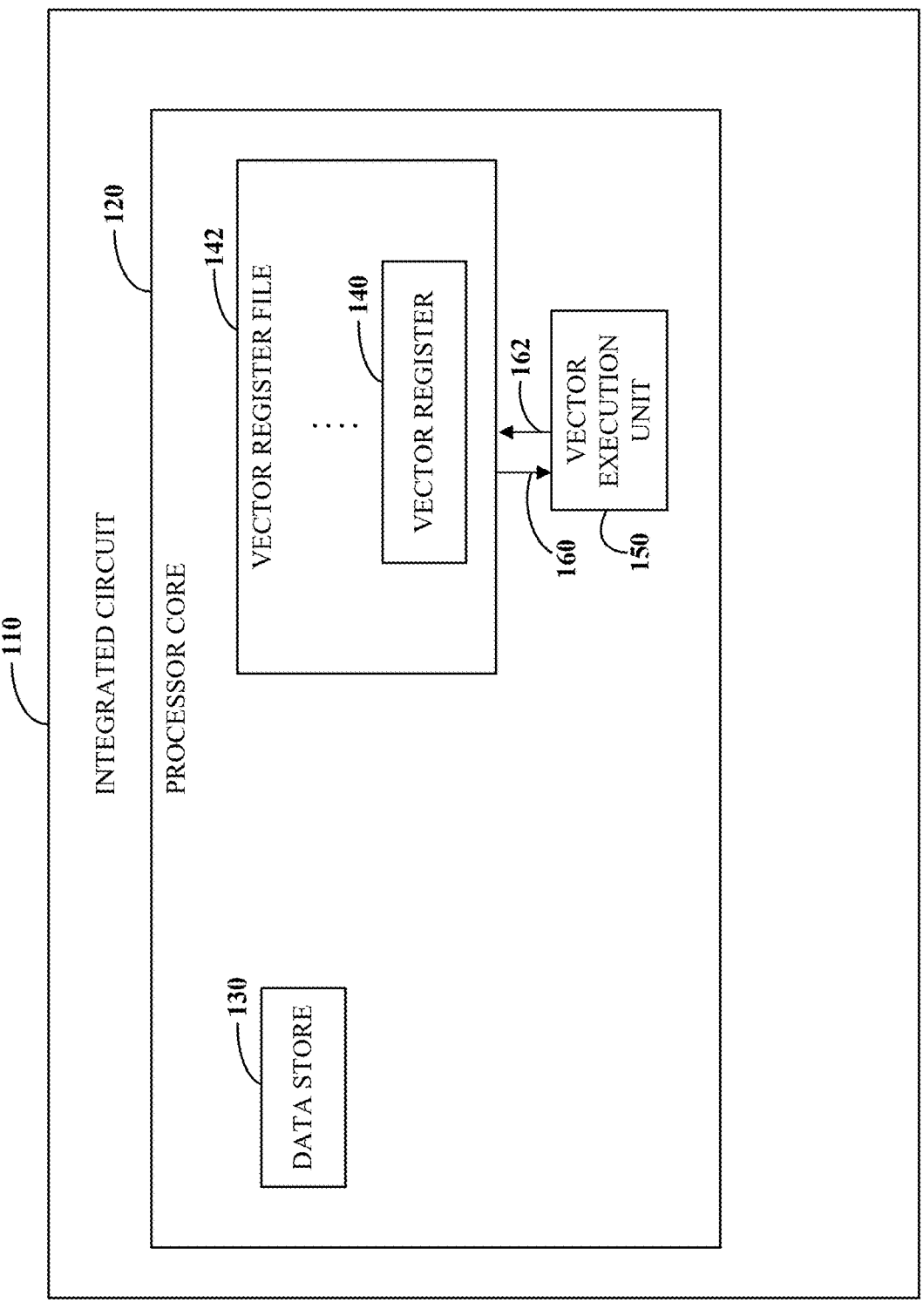
FIG. 1 is a block diagram of an example of an integrated circuit for supporting multiple vector lengths with a configurable vector register file.

Systems and methods are described herein that may be used to support multiple architectural maximum vector lengths with a configurable vector register file. In a vector-length-agnostic (VLA) vector architecture, each implementation has an actual maximum architectural vector register length (e.g., VLEN measured in bits). Using the features of a VLA architecture, software can be written to produce the same results when the same binary program is run on two machines with different VLEN. However, because the mapping of elements to vector registers can differ during run-time, a running program using the vector unit cannot generally be migrated between two cores with different VLEN and produce correct results.

It is desirable for a processor with longer VLEN to be able to emulate a core with shorter VLEN in order to support correct thread migration.

For simplicity, consider an example of a processor with VLEN hardware registers (the wider machine) emulating a processor with VLEN/2 vector registers (the narrower machine). The wider processor has VLEN-wide datapaths for executing vector instructions in one cycle.

One possible approach is for the emulation to simply shorten each vector register from VLEN to VLEN/2, but this will make inefficient use of vector execution hardware when vector registers are grouped to make longer vector registers, as only half of the wider vector unit will be active. For example, if two VLEN/2 vector registers are grouped together, the wider machine will take two cycles to execute a vector instruction on a vector register group of the narrower machine, operating at VLEN/2 bits per cycle, whereas the underlying wider hardware is capable of operating at VLEN bits per cycle and completing the operation in one cycle.

A second approach might be to simply map the narrow machine's vector register group into a smaller vector register group of the wider machine. For example, a group of two VLEN/2 vector registers can be held in a single VLEN vector register of the wider machine. However, instruction set architectures that group architectural vector registers together to provide longer vectors allow software to use the individual vector register names to access portions of the vector register group, and the mapping of elements to individual vector registers depends on VLEN.

For example, consider an implementation with vector registers of maximum length VLEN holding an 8-element vector register in two vector registers combined as a group (each element is VLEN/4 bits wide). The elements will be mapped to architectural vector registers within the group as follows:

$V1$ 7 6 5 4

$V0$ 3 2 1 0

Now consider emulating this 8-element vector register group on a wider machine with vector registers of maximum length VLEN. The elements would be mapped as follows:

$V1$<empty>

$V0$ 7 6 5 4 3 2 1 0

Although instructions executed on the full vector register group starting at V0 can now use the entire wider VLEN datapath width for greater performance, software written for the VLEN/2 machine will not see the correct values if architectural vector register V1 is accessed directly.

A solution instead emulates VLEN/2 machines by holding two emulated VLEN/2 registers in one VLEN hardware register:

$V1$: 7 6 5 4 $V0$: 3 2 1 0

In this solution, half the hardware vector registers (hardware V15-V31 with 32 vector registers) may be turned off while emulating VLEN/2. A benefit is when software is using paired groups of vector registers, it will still obtain full hardware throughput on the datapath, i.e., use all VLEN of the hardware when software is performing operations using 2*VLEN/2 vector registers.

Additional datapath multiplexors may be provided to handle, single vector register cases such as:

$V3$: 3 2 1 0 $V2$: 3 2 1 0

$V1$: 3 2 1 0 $V0$: 3 2 1 0 where architectural vector registers V0 and V1 are held together in a first hardware register and the architectural vector registers V2 and V3 are held together in a second hardware register. For example, the operation V1=V2+V0 involves writing to a different segment of a datapath than the input operands are presented in. To address this, operands may be shifted or routed between datapath segments before and/or after execution of an operation For example, some embodiments always execute operations in the half of the datapath that has the destination effective vector register.

In some implementations, execution with narrower effective VLEN may be optimized by routing operands to a segment of a datapath that requires the least energy to move operands. For example, with:

$V3$: 3 2 1 0 $V2$: 3 2 1 0

$V1$: 3 2 1 0 $V0$: 3 2 1 0

The operation V1=v0+v2 may be execute in the lower half to avoid sending v0 and v2 to v1 side, and instead only send the result. Other examples include:

$V1$=v0+v2 (v1 shifted)

$V1$=v1+v3 (nothing shifted)

$V1$=v1+v2 (v2 shifted)

Some implementations may use multiple segments to execute multiple narrower vector instructions simultaneously, where each vector instruction was using a narrower effective VLEN. For example, with:

$V3$: 3 2 1 0 $V2$: 3 2 1 0

$V1$: 3 2 1 0 $V0$: 3 2 1 0

The two vector instructions, V1+=v3||v0+=v2, may be executed in parallel.

Benefits may include a capability to clock gate and power gate unused whole hardware vector registers when configured in the shorter VLEN mode.

A system may be configurable to support any smaller power of 2 than the hardware VLEN, and possibly multiple smaller powers-of-2. (e.g., 512, 256, and 128).

Some implementations may provide advantages over conventional processors, such as, for example, enabling the migration of a thread from processor with a smaller maximum vector length, better utilizing native datapaths and execution resources while emulating a smaller maximum vector length, and/or increasing the speed/performance of a vector processor in some conditions.

As used herein, the term "circuitry" refers to an arrangement of electronic components (e.g., transistors, resistors, capacitors, and/or inductors) that is structured to implement one or more functions. For example, a circuitry may include one or more transistors interconnected to form logic gates that collectively implement a logical function.

Details

FIG. 1 is a block diagram of an example of an integrated circuit 110 for supporting multiple vector lengths with a configurable vector register file. The integrated circuit 110 includes a processor core 120, which includes a data store 130 (e.g., a control status register) configured to store a vector length parameter. The processor core 120 includes a vector register 140. The vector register 140 is part of a vector register file 142, which may include multiple similar vector registers (e.g., 32 vector registers). The processor core 120 includes a vector execution unit 150 connected to the vector register 140 by a datapath of width matching the length of the vector register 140 (e.g., the native hardware vector length of the processor core 120). The processor core 120 may be configured to emulate a core with a hardware vector length less than the native hardware vector length in response to writing a particular value to the vector length parameter stored in the data store 130. The processor core 120 may be configured to, while a first value of the vector length parameter is stored in the data store 130, store a single architectural register of an instruction set architecture in the vector register 140; and, while a second value of the vector length parameter is stored in the data store 130, store multiple architectural registers of the instruction set architecture in respective disjoint portions of the vector register 140. For example, the integrated circuit 110 may be used to implement the process 600 of FIG. 6, the process 700 of FIG. 7, the process 800 of FIG. 8, and/or the process 900 of FIG. 9.

The integrated circuit 110 includes a data store 130 configured to store a vector length parameter. The data store 130 is circuitry configured to store data. For example, the data store 130 may include flip-flops, latches, or other circuitry for storing data. In some implementations, the data store 130 is a control status register of the processor core 120. The vector length parameter may be stored in one or more bits of the data store 130. For example, vector length parameter may be binary flag indicating whether a small vector emulation mode, with a fixed factor of vector length reduction (e.g., a factor of 2 or 4), is active or not. In some implementations, vector length parameter takes values that map to one of more than two supported vector length emulation modes. For example, a two-bit vector length parameter stored in the data store 130 may be used to select among four modes: no emulation (use the native hardware vector length, VLEN); half-mode (use half of the native hardware vector length, VLEN/2); quarter-mode (use 25% of the native hardware vector length, VLEN/4); and eight-mode (use 12.5% of the native hardware vector length, VLEN/8). In some implementations, more than a minimal number of bits may be included in the vector length parameter and used to specify a small vector emulation mode. For example, vector length parameter may be stored in the data store 130 as a binary encoding of an effective VLEN (e.g., 64, 128, 256, or 512) in an emulation mode or as a vector length reduction factor (e.g., 1, 2, 4, or 8) for an emulation mode.

The integrated circuit 110 includes a processor core 120 including a vector register 140. The vector register 140 is of length N bits (e.g., N=128, 256, 512, or 1024). N may correspond to a native hardware vector length of the processor core 120. The processor core 120 is configured to, while a first value of the vector length parameter is stored in the data store 130 (e.g., indicating no-emulation mode), store a single architectural register of an instruction set architecture in the vector register 140; and, while a second value of the vector length parameter is stored in the data store 130 (e.g., indicating a small vectors emulation mode), store multiple architectural registers of the instruction set architecture in respective disjoint portions of the vector register 140. For example, FIGS. 2A and 2B illustrate the storage of multiple architectural registers in respective disjoint portions of the vector register 140. For example, the instruction set architecture may be a RISC-V instruction set architecture. In some implementations, the vector register 140 is partitioned into K portions that each store a respective architectural register of the instruction set architecture, where K is a power of two. By packing multiple architectural registers into fewer hardware vector registers, the processor core 120 may emulate a processor core with a smaller hardware vector length, while continuing to make efficient use of its datapaths that are sized to match the length (N) of the vector register 140. Packing the multiple architectural registers into fewer hardware vector registers, may also enable efficient implementation of logical vector grouping that is supported by some instruction set architectures (e.g., LMUL>1 in RISC-V).

In this example, the vector register 140 is part of a vector register file 142 of the processor core 120. In some implementations, when the second value of the vector length parameter is stored in the data store 130, the processor core 120 is configured to shut down a first subset of vector registers (e.g., half or three quarters of the vector registers) in the vector register file 142 while the architectural registers are packed into a second subset of vector registers (e.g., e.g., half or one quarter of the vector registers) in the vector register file 142 that is disjoint from the first subset.

The processor core 120 includes a vector execution unit 150 (e.g., a vector arithmetic logic unit) connected to the vector register by a datapath of width N bits. The vector execution unit 150 is configured to perform an operation on elements of the multiple architectural registers stored in the vector register 140 in parallel. In some implementations, grouping of architectural registers that are stored together in the vector register 140 may be used to exploit parallelism by utilizing more bits of the datapath in a single instruction. In some implementations, macro-op fusion of vector instructions may be opportunistically employed by the processor core to combine macro-ops that operate on different architectural registers stored together in the vector register 140 and operate on the different architectural registers in parallel in the vector execution unit 150, to utilize more bits of the datapath. In this example, the vector execution unit 150 includes an input port 160 of width N bits and an output port 162 of width N bits. In some implementations (not shown in FIG. 1), the vector execution unit 150 may have additional ports connecting it to a datapath of the processor core 120.

To facilitate operations involving architectural registers stored in portions of the vector register 140 corresponding to different segments or portions of the datapath, operands may be shifted or routed between segments in the data path. In some implementations, one or more multiplexors in a datapath may be used to route an operand between segments of the datapath before or after an operation is executed by the vector execution unit 150. For example, the processor core 120 may include one or more multiplexors configured to selectively route data of an architectural register stored in a portion of the vector register 140 to one of multiple disjoint portions of an operand buffer in the vector execution unit 150. The vector register 140 and the operand buffer may have a same length in bits. For example, the processor core 120 may include one or more multiplexors configured to selectively route data of a portion of an operand buffer in the vector execution unit 150 to one of multiple disjoint portions of the vector register 140 corresponding to a respective architectural register stored in the vector register 140. The vector register 140 and the operand buffer may have a same length in bits. For example, the datapath may include multiplexors for routing operands between segments as shown in FIG. 3 and/or as shown in FIG. 4.

FIG. 2A is a memory map diagram of an example of a vector register 200 configured to store two architectural vector registers. In this example, the vector register 200 is partitioned into two disjoint portions corresponding to respective architectural registers of an instruction. The vector register 200 has a total length of N bits. A first architectural register (V0) is stored in a first portion 210 of the vector register 200, where the first portion 210 has a length of N/2 bits. A second architectural register (V1) is stored in a second portion 220 of the vector register 200, where the second portion 220 has a length of N/2 bits. The first portion 210 and the second portion 220 are disjoint in the sense that they do not overlap. In the illustrated mode, the vector register 200 may be used to emulate a processor core with a hardware vector length of N/2.

FIG. 2B is a memory map diagram of an example of a vector register 250 configured to store four architectural vector registers. In this example, the vector register 250 is partitioned into four disjoint portions corresponding to respective architectural registers of an instruction. The vector register 250 has a total length of N bits. A first architectural register (V0) is stored in a first portion 260 of the vector register 250, where the first portion 260 has a length of N/4 bits. A second architectural register (V1) is stored in a second portion 262 of the vector register 250, where the second portion 262 has a length of N/4 bits. A third architectural register (V2) is stored in a third portion 264 of the vector register 250, where the third portion 264 has a length of N/4 bits. A fourth architectural register (V3) is stored in a fourth portion 266 of the vector register 250, where the fourth portion 266 has a length of N/4 bits. The first portion 260, the second portion 262, the third portion 264, and the fourth portion 266 are disjoint in the sense that they do not overlap. In the illustrated mode, the vector register 250 may be used to emulate a processor core with a hardware vector length of N/4.

Figure 3:
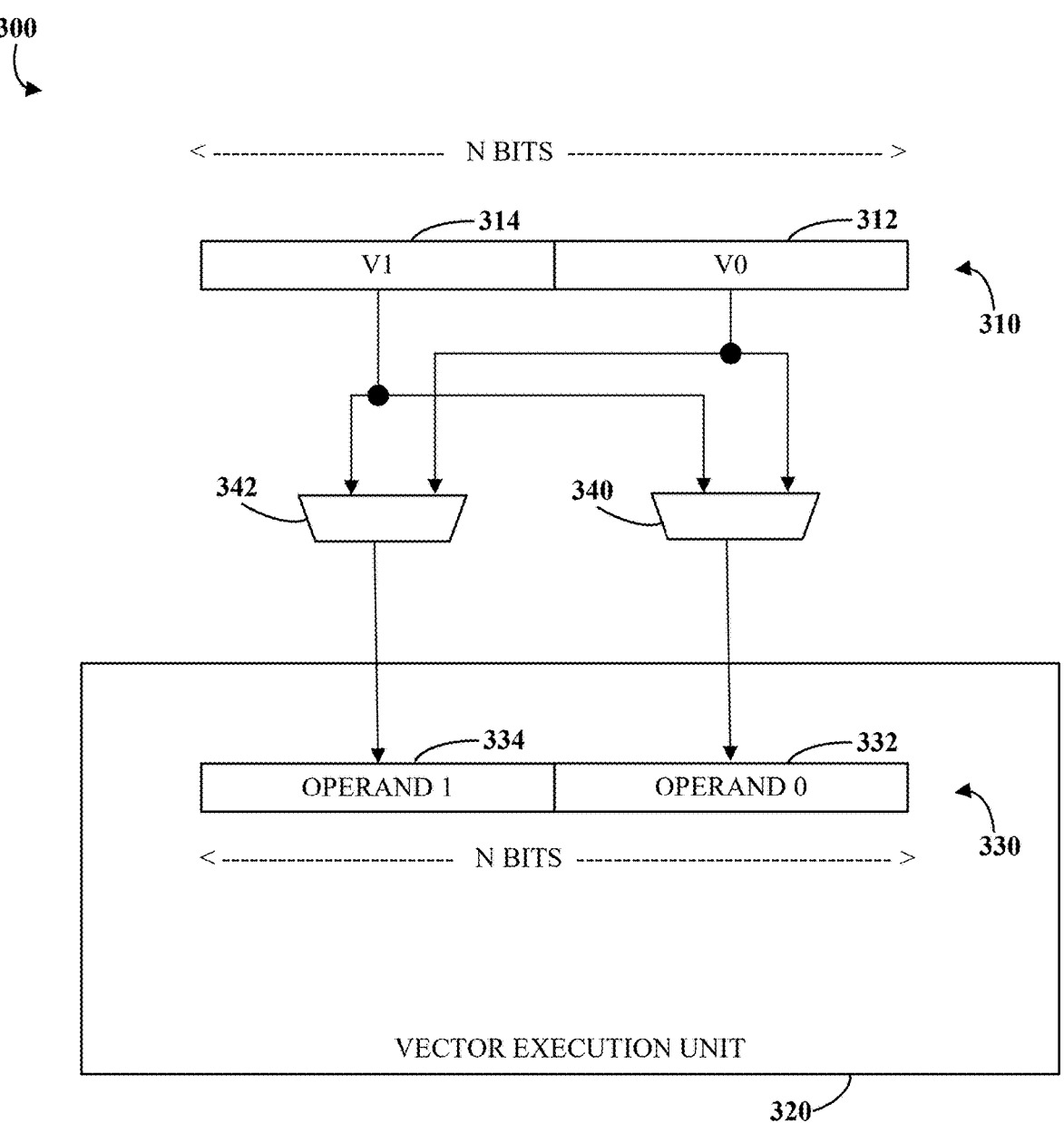
FIG. 3 is a block diagram of an example of a datapath between a vector register and an operand buffer of a vector execution unit for reading source data from the vector register into the vector execution unit.
Figure 4:
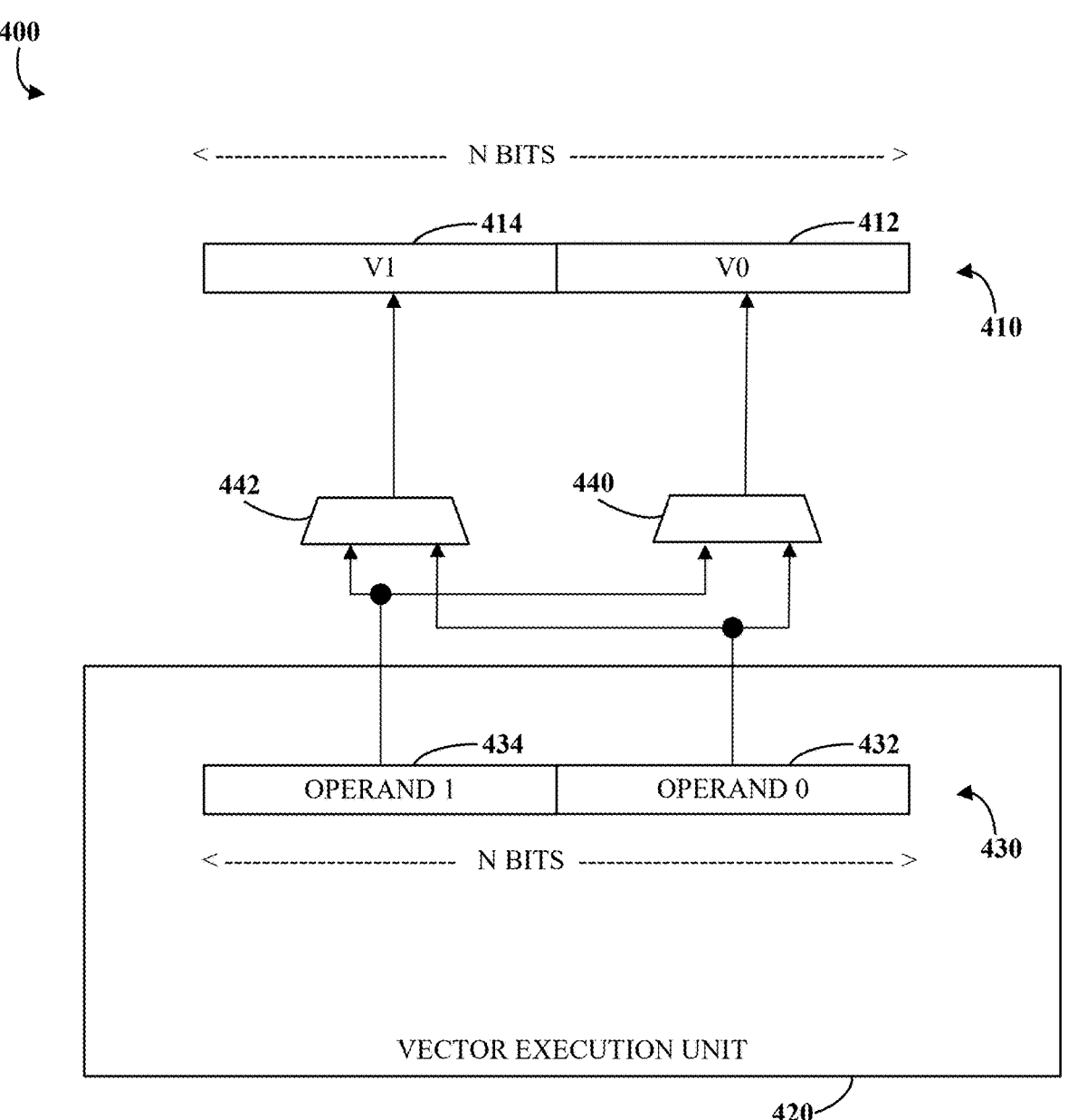
FIG. 4 is a block diagram of an example of a datapath between a vector register and an operand buffer of a vector execution unit for writing destination data from the vector execution unit into the vector register.

FIG. 3 is a block diagram of an example of a datapath 300 between a vector register 310 and an operand buffer 330 of a vector execution unit 320 for reading source data from the vector register 310 into the vector execution unit 320. In this example, the datapath 300 has been divided into two segments to facilitate the emulation of a processor with a hardware vector length of the N/2. The vector register 310 includes a first portion 312 that stores a first architectural register (V0) and a second portion 314 that stores a second architectural register (V1). The first portion 312 is disjoint from the second portion 314. The vector register 310 has a length of N bits. The operand buffer 330 also has a length of N bits. The operand buffer 330 includes a first portion 332 and a second portion 334. The first portion 332 is disjoint from the second portion 334. The datapath 300 includes a first multiplexor 340 configured to selectively route data of an architectural register stored in a portion of the vector register 310 (e.g., V0 or V1) to the first portion 332 of the operand buffer 330. The datapath 300 includes a second multiplexor 342 configured to selectively route data of an architectural register stored in a portion of the vector register 310 (e.g., V0 or V1) to the second portion 334 of the operand buffer 330. Together, the first multiplexor 340 and the second multiplexor 342 are configured to selectively route data of an architectural register stored in a portion of the vector register 310 to one of multiple disjoint portions of the operand buffer 330 in the vector execution unit 320. For example, the select signals (not shown in FIG. 3) for the first multiplexor 340 and the second multiplexor 342 may be driven based on a micro-op being executed by the vector execution unit 320 that needs to shift data to combine operands in a single segment of the datapath 300.

FIG. 4 is a block diagram of an example of a datapath 400 between a vector register 410 and an operand buffer 430 of a vector execution unit 420 for writing destination data from the vector execution unit 420 into the vector register 410. In this example, the datapath 400 has been divided into two segments to facilitate the emulation of a processor with a hardware vector length of the N/2. The vector register 410 includes a first portion 412 that stores a first architectural register (V0) and a second portion 414 that stores a second architectural register (V1). The first portion 412 is disjoint from the second portion 414. The vector register 410 has a length of N bits. The operand buffer 430 also has a length of N bits. The operand buffer 430 includes a first portion 432 and a second portion 434. The first portion 432 is disjoint from the second portion 434. The datapath 400 includes a first multiplexor 440 configured to selectively route data of a portion of the operand buffer 430 to the first portion 412 of the vector register 410 corresponding to a respective architectural register (V0) stored in the vector register 410. The datapath 400 includes a second multiplexor 442 configured to selectively route data of a portion of the operand buffer 430 to the second portion 414 of the vector register 410 corresponding to a respective architectural register (V1) stored in the vector register 410. Together, the first multiplexor 440 and the second multiplexor 442 are configured to selectively route data of a portion of an operand buffer 430 in the vector execution unit 420 to one of multiple disjoint portions of the vector register 410 corresponding to a respective architectural register (e.g., V0 or V1) stored in the vector register 410. For example, the select signals (not shown in FIG. 4) for the first multiplexor 440 and the second multiplexor 442 may be driven based on a micro-op being executed by the vector execution unit 420 that needs to shift data to write a result to a different segment of the datapath 400 than the segment in which it was determined by the vector execution unit 420.

Figure 5:
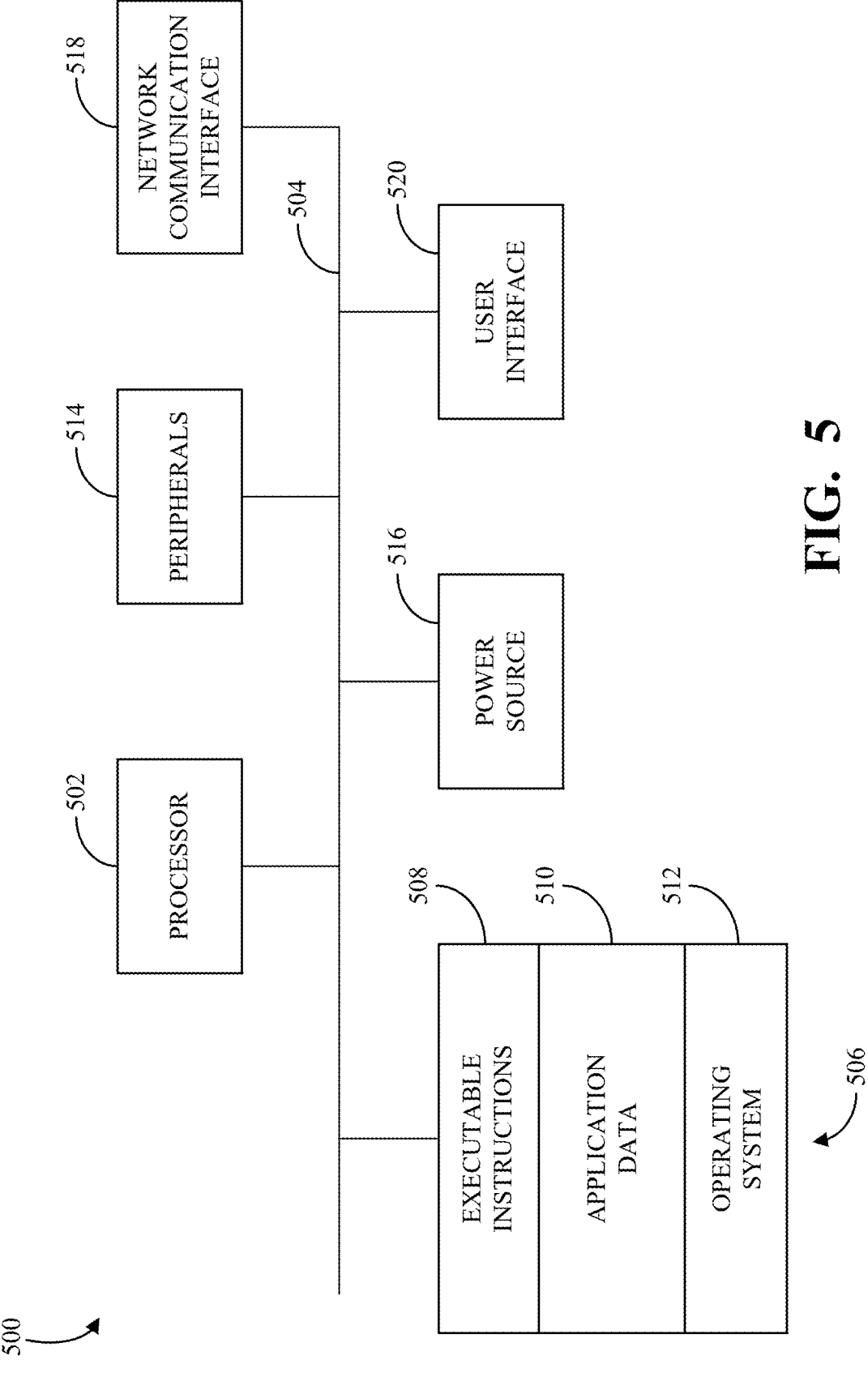
FIG. 5 is a block diagram of an example of a system for facilitating generation of a circuit representation.

FIG. 5 is a block diagram of an example of a system 500 for facilitating generation of a circuit representation, and/or for programming or manufacturing an integrated circuit. The system 500 is an example of an internal configuration of a computing device. For example, the system 500 may be used to generate a file that generates a circuit representation of an integrated circuit (e.g., the integrated circuit 110), including a processor core (e.g., the processor core 120) which supports emulation of multiple vector lengths with a configurable vector register file. The system 500 can include components or units, such as a processor 502, a bus 504, a memory 506, peripherals 514, a power source 516, a network communication interface 518, a user interface 520, other suitable components, or a combination thereof.

The processor 502 can be a central processing unit (CPU), such as a microprocessor, and can include single or multiple processors having single or multiple processing cores. Alternatively, the processor 502 can include another type of device, or multiple devices, now existing or hereafter developed, capable of manipulating or processing information. For example, the processor 502 can include multiple processors interconnected in any manner, including hardwired or networked, including wirelessly networked. In some implementations, the operations of the processor 502 can be distributed across multiple physical devices or units that can be coupled directly or across a local area or other suitable type of network. In some implementations, the processor 502 can include a cache, or cache memory, for local storage of operating data or instructions.

The memory 506 can include volatile memory, non-volatile memory, or a combination thereof. For example, the memory 506 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 506 can include another type of device, or multiple devices, now existing or hereafter developed, capable of storing data or instructions for processing by the processor 502. The processor 502 can access or manipulate data in the memory 506 via the bus 504. Although shown as a single block in FIG. 5, the memory 506 can be implemented as multiple units. For example, a system 500 can include volatile memory, such as random access memory (RAM), and persistent memory, such as a hard drive or other storage.

The memory 506 can include executable instructions 508, data, such as application data 510, an operating system 512, or a combination thereof, for immediate access by the processor 502. The executable instructions 508 can include, for example, one or more application programs, which can be loaded or copied, in whole or in part, from non-volatile memory to volatile memory to be executed by the processor 502. The executable instructions 508 can be organized into programmable modules or algorithms, functional programs, codes, code segments, or combinations thereof to perform various functions described herein. For example, the executable instructions 508 can include instructions executable by the processor 502 to cause the system 500 to automatically, in response to a command, generate an integrated circuit design and associated test results based on a design parameters data structure. The application data 510 can include, for example, user files, database catalogs or dictionaries, configuration information or functional programs, such as a web browser, a web server, a database server, or a combination thereof. The operating system 512 can be, for example, Microsoft Windows®, macOS®, or Linux®; an operating system for a small device, such as a smartphone or tablet device; or an operating system for a large device, such as a mainframe computer. The memory 506 can comprise one or more devices and can utilize one or more types of storage, such as solid-state or magnetic storage.

The peripherals 514 can be coupled to the processor 502 via the bus 504. The peripherals 514 can be sensors or detectors, or devices containing any number of sensors or detectors, which can monitor the system 500 itself or the environment around the system 500. For example, a system 500 can contain a temperature sensor for measuring temperatures of components of the system 500, such as the processor 502. Other sensors or detectors can be used with the system 500, as can be contemplated. In some implementations, the power source 516 can be a battery, and the system 500 can operate independently of an external power distribution system. Any of the components of the system 500, such as the peripherals 514 or the power source 516, can communicate with the processor 502 via the bus 504.

The network communication interface 518 can also be coupled to the processor 502 via the bus 504. In some implementations, the network communication interface 518 can comprise one or more transceivers. The network communication interface 518 can, for example, provide a connection or link to a network, via a network interface, which can be a wired network interface, such as Ethernet, or a wireless network interface. For example, the system 500 can communicate with other devices via the network communication interface 518 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 520 can include a display; a positional input device, such as a mouse, touchpad, touchscreen, or the like; a keyboard; or other suitable human or machine interface devices. The user interface 520 can be coupled to the processor 502 via the bus 504. Other interface devices that permit a user to program or otherwise use the system 500 can be provided in addition to or as an alternative to a display. In some implementations, the user interface 520 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 514. The operations of the processor 502 can be distributed across multiple clients or servers, which can be coupled directly or across a local area or other suitable type of network. The memory 506 can be distributed across multiple clients or servers, such as network-based memory or memory in multiple clients or servers performing the operations of clients or servers. Although depicted here as a single bus, the bus 504 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming. In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

FIG. 6 is a flow chart of an example of a process 600 for using support for multiple vector lengths with a configurable vector register file to emulate a processor core with a smaller maximum vector length and enable migration of a running thread from a core with a smaller maximum vector length. The process 600 includes changing 610 a configuration of a processor core including a vector register from a first mode where a single architectural register of an instruction set architecture is stored in the vector register to a second mode where multiple architectural registers of the instruction set architecture are stored in the vector register; loading 620 a state of a thread that has run on a second processor core with a smaller maximum vector length than the processor core into registers of the processor core, including the vector register; and continuing 630 execution of the thread using the processor core in the second mode to emulate a maximum vector length equal to the maximum vector length of the second processor core. For example, the process 600 may be implemented using the integrated circuit 110 of FIG. 1.

The process 600 includes changing 610 a configuration of a processor core (e.g., the processor core 120) including a vector register (e.g., the vector register 140) from a first mode where a single architectural register of an instruction set architecture is stored in the vector register to a second mode where multiple architectural registers of the instruction set architecture are stored in the vector register. For example, the configuration of the processor core may be changed 610 from the first mode to the second mode by writing a vector length parameter to a control status register of the processor core. In some implementations, the vector register is partitioned into portions that each store a respective architectural register of the instruction set architecture. In some implementations, the vector register is part of a vector register file of the processor core and, in the second mode of the processor core, a first subset of vector registers in the vector register file is shut down while the architectural vector registers are packed into a second subset of vector registers in the vector register file that is disjoint from the first subset. For example, the process 700 of FIG. 7 may be implemented when changing 610 from the first mode to the second mode. For example, the instruction set architecture may be a RISC-V instruction set architecture.

The process 600 includes loading 620 a state of a thread that has run on a second processor core with a smaller maximum vector length than the processor core into registers of the processor core, including the vector register. For example, the loading of the state of the thread may be performed using software running on the processor core for migrating the thread to the processor core after its state has been stored in memory by the second processor core.

The process 600 includes continuing 630 execution of the thread using the processor core in the second mode to emulate a maximum vector length equal to the maximum vector length of the second processor core. In some implementations, continuing 630 execution of the thread on the processor core in the second mode may include performing an operation on elements of the multiple architectural registers stored in the vector register in parallel using a single transfer of data from the vector register to a vector execution unit via a datapath of a width that matches the length of the vector register. For example, continuing 630 execution on the processor core in the second mode may include implementing the process 900 of FIG. 9. In some implementations, continuing 630 execution on the processor core in the second mode may include selectively routing data between segments of a data path to align architectural registers stored in respective portions of the vector register with another operand for an instruction being executed in a vector execution unit. Data may also be selectively routed when writing results of an operation back to a portion of the vector register that is storing an architectural register that serves as a destination for a result of an operation. For example, continuing 630 execution on the processor core in the second mode may include implementing the process 800 of FIG. 8.

FIG. 7 is a flow chart of an example of a process 700 for changing a mode of processor core to use a smaller maximum vector length than the native maximum vector length of the processor core. In this example, the vector register is part of a vector register file (e.g., the vector register file 142) of the processor core. The process 700 includes partitioning 710 the vector register into K portions that each store a respective architectural register of the instruction set architecture. For example, K may be a power of two. This partition may enable the packing multiple architectural register into the vector register. The process 700 includes, in the second mode of the processor core, shutting down 720 a first subset of vector registers in the vector register file while architectural vector registers are packed into a second subset of vector registers in the vector register file that is disjoint from the first subset. For example, a vector register in the vector register file may be shut down 720 by clock gating and/or power gating the vector register. Consider an example, where the instruction set architecture specifies 32 vector registers (V0 through V31); the vector register file includes 32 hardware registers of length N bits; and K is 2, i.e., the processor core is configured to emulate a processor core with a hardware vector length half of the length the vector register. In this example, half of the vector registers in the vector register file may be shut down 720 and the 32 architectural registers may be stored in pairs in the remaining half of the registers in the vector register file. In a similar example, were K=8, seven eighths (or 28) of the vector registers in the vector register file may be shut down 720 and the 32 architectural registers may be stored in sets of 8 in the remaining eighth (or 4) of the registers in the vector register file.

FIG. 8 is a flow chart of an example of a process 800 for selectively routing between different portions of a datapath to enable various combinations of architectural vector registers to be paired for execution even when they occupy different portions of their vector registers. The process 800 includes selectively routing 810 data of an architectural register stored in a first portion of the vector register to one of multiple disjoint portions of an operand buffer in a vector execution unit. The vector register and the operand buffer may have a same length in bits. For example, the datapath 300 of FIG. 3 may be used to selectively route 810 the data from the vector register to an appropriate portion of the operand buffer for executing an instruction in the vector execution unit. The process 800 includes selectively routing 820 data of a portion of an operand buffer in a vector execution unit to one of multiple disjoint portions of the vector register corresponding to a respective architectural register stored in the vector register. For example, the datapath 400 of FIG. 4 may be used to selectively route 820 the data from the operand buffer to an appropriate portion of the vector register that stores an architectural register that is a destination register of an instruction being executed in the vector execution unit.

Figure 9:
FIG. 9 is a flow chart of an example of a process for utilizing a datapath that is wider than the architectural registers stored in a vector register to simultaneously read multiple architectural vector registers to facilitate parallel execution.

FIG. 9 is a flow chart of an example of a process 900 for utilizing a datapath that is wider than the architectural registers stored in a vector register to simultaneously read multiple architectural vector registers to facilitate parallel execution. The vector register is of length N bits. The process 900 includes performing 910 an operation on elements of the multiple architectural registers stored in the vector register in parallel using a single transfer of data from the vector register to a vector execution unit via a datapath of width N bits. In some implementations, grouping of architectural registers that are stored together in the vector register may be used to exploit parallelism by utilizing more bits of the datapath in a single instruction. In some implementations, macro-op fusion of vector instructions may be opportunistically employed by the processor core to combine macro-ops that operate on different architectural registers stored together in the vector register and operate on the different architectural registers in parallel in the vector execution unit, to utilize more bits of the datapath.

In a first aspect, the subject matter described in this specification can be embodied in an integrated circuit that includes a data store configured to store a vector length parameter; a processor core including a vector register, wherein the processor core is configured to: while a first value of the vector length parameter is stored in the data store, store a single architectural register of an instruction set architecture in the vector register; and, while a second value of the vector length parameter is stored in the data store, store multiple architectural registers of the instruction set architecture in respective disjoint portions of the vector register.

In the first aspect, the vector register may be of length N bits and the processor core may include a vector execution unit connected to the vector register by a datapath of width N bits, in which the vector execution unit is configured to perform an operation on elements of the multiple architectural registers stored in the vector register in parallel. In the first aspect, the processor core may include one or more multiplexors configured to selectively route data of an architectural register stored in a portion of the vector register to one of multiple disjoint portions of an operand buffer in the vector execution unit, wherein the vector register and the operand buffer have a same length in bits. In the first aspect, the processor core may include one or more multiplexors configured to selectively route data of a portion of an operand buffer in the vector execution unit to one of multiple disjoint portions of the vector register corresponding to a respective architectural register stored in the vector register, wherein the vector register and the operand buffer have a same length in bits. In the first aspect, the vector register may be part of a vector register file of the processor core and, when the second value of the vector length parameter is stored in the data store, the processor core may be configured to shut down a first subset of vector registers in the vector register file while the architectural registers are packed into a second subset of vector registers in the vector register file that is disjoint from the first subset. In the first aspect, the vector register may be partitioned into K portions that each store a respective architectural register of the instruction set architecture, where K is a power of two. In the first aspect, the data store may be a control status register of the processor core. In the first aspect, the instruction set architecture may be a RISC-V instruction set architecture.

In a second aspect, the subject matter described in this specification can be embodied in methods that include changing a configuration of a processor core including a vector register from a first mode where a single architectural register of an instruction set architecture is stored in the vector register to a second mode where multiple architectural registers of the instruction set architecture are stored in the vector register.

In the second aspect, the configuration of the processor core may be changed from the first mode to the second mode by writing a vector length parameter to a control status register of the processor core. In the second aspect, the vector register may be of length N bits, and the methods may include performing an operation on elements of the multiple architectural registers stored in the vector register in parallel using a single transfer of data from the vector register to a vector execution unit via a datapath of width N bits. In the second aspect, the vector register may be part of a vector register file of the processor core and the methods may include, in the second mode of the processor core, shutting down a first subset of vector registers in the vector register file while architectural vector registers are packed into a second subset of vector registers in the vector register file that is disjoint from the first subset. In the second aspect, the vector register may be partitioned into K portions that each store a respective architectural register of the instruction set architecture, where K is a power of two. In the second aspect, the methods may include loading a state of a thread that has run on a second processor core with a smaller maximum vector length than the processor core into registers of the processor core, including the vector register; and continuing execution of the thread using the processor core in the second mode to emulate a maximum vector length equal to the maximum vector length of the second processor core. In the second aspect, the methods may include selectively routing data of an architectural register stored in a first portion of the vector register to one of multiple disjoint portions of an operand buffer in a vector execution unit, wherein the vector register and the operand buffer have a same length in bits. In the second aspect, the methods may include selectively routing data of a portion of an operand buffer in a vector execution unit to one of multiple disjoint portions of the vector register corresponding to a respective architectural register stored in the vector register, wherein the vector register and the operand buffer have a same length in bits. In the second aspect, the instruction set architecture may be a RISC-V instruction set architecture.

In a third aspect, the subject matter described in this specification can be embodied in a non-transitory computer readable medium comprising a circuit representation that, when processed by a computer, is used to program or manufacture an integrated circuit that includes a data store configured to store a vector length parameter; a processor core including a vector register, wherein the processor core is configured to: while a first value of the vector length parameter is stored in the data store, store a single architectural register of an instruction set architecture in the vector register; and, while a second value of the vector length parameter is stored in the data store, store multiple architectural registers of the instruction set architecture in respective disjoint portions of the vector register.

In the third aspect, the vector register may be of length N bits and the processor core may include a vector execution unit connected to the vector register by a datapath of width N bits, in which the vector execution unit is configured to perform an operation on elements of the multiple architectural registers stored in the vector register in parallel. In the third aspect, the processor core may include one or more multiplexors configured to selectively route data of an architectural register stored in a portion of the vector register to one of multiple disjoint portions of an operand buffer in the vector execution unit, wherein the vector register and the operand buffer have a same length in bits. In the third aspect, the processor core may include one or more multiplexors configured to selectively route data of a portion of an operand buffer in the vector execution unit to one of multiple disjoint portions of the vector register corresponding to a respective architectural register stored in the vector register, wherein the vector register and the operand buffer have a same length in bits. In the third aspect, the vector register may be part of a vector register file of the processor core and, when the second value of the vector length parameter is stored in the data store, the processor core may be configured to shut down a first subset of vector registers in the vector register file while the architectural registers are packed into a second subset of vector registers in the vector register file that is disjoint from the first subset. In the third aspect, the vector register may be partitioned into K portions that each store a respective architectural register of the instruction set architecture, where K is a power of two. In the third aspect, the data store may be a control status register of the processor core. In the third aspect, the instruction set architecture may be a RISC-V instruction set architecture.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit comprising:
a data store configured to store a vector length parameter;
a hardware processor core including:
a vector register;
a vector execution unit comprising an operand buffer, wherein the vector register and the operand buffer have a same length in bits; and
one or more multiplexors configured to selectively route data of a first architectural register stored in a first portion of the vector register to one of multiple disjoint portions of the operand buffer based on an identity of a second architectural register providing a second operand for an instruction being executed;
wherein the hardware processor core is configured to:
while a first value of the vector length parameter is stored in the data store, store a single architectural register of an instruction set architecture in the vector register; and
while a second value of the vector length parameter is stored in the data store, store multiple architectural registers of the instruction set architecture in respective disjoint portions of the vector register.

2. The integrated circuit of claim 1, wherein the vector register is of length N bits and the vector execution unit is connected to the vector register by a datapath of width N bits, wherein N is a positive integer.

3. The integrated circuit of claim 1, in which the vector register is part of a vector register file of the hardware processor core and, when the second value of the vector length parameter is stored in the data store, the hardware processor core is configured to shut down a first subset of vector registers in the vector register file while the architectural registers are packed into a second subset of vector registers in the vector register file that is disjoint from the first subset.

4. The integrated circuit of claim 1, in which the vector register is partitioned into K portions that each store a respective architectural register of the instruction set architecture, where K is a power of two and is a positive integer.

5. The integrated circuit of claim 1, in which the data store is a control status register of the hardware processor core.

6. The integrated circuit of claim 1, in which the instruction set architecture is a RISC-V instruction set architecture.

7. A method comprising:
changing a configuration of a processor core including a vector register from a first mode where a single architectural register of an instruction set architecture is stored in the vector register to a second mode where multiple architectural registers of the instruction set architecture are stored in respective disjoint portions of the vector register; and
while operating in the second mode, selectively routing, using one or more multiplexors of the processor core, data of a first architectural register stored in a first portion of the vector register to one of multiple disjoint portions of an operand buffer within a vector execution unit of the processor core based at least in part on an identity of a second architectural register providing a second operand for an instruction being executed, wherein the vector register and the operand buffer have a same length in bits.

8. The method of claim 7, in which the configuration of the processor core is changed from the first mode to the second mode by writing a vector length parameter to a control status register of the processor core.

9. The method of claim 7, in which the vector register is of length N bits, further comprising:
performing an operation on elements of the multiple architectural registers stored in the vector register in parallel using a single transfer of data from the vector register to the vector execution unit via a datapath of width N bits, wherein N is a positive integer.

10. The method of claim 7, in which the vector register is part of a vector register file of the processor core, and further comprising:
in the second mode of the processor core, shutting down a first subset of vector registers in the vector register file while architectural vector registers are packed into a second subset of vector registers in the vector register file that is disjoint from the first subset.

11. The method of claim 7, in which the vector register is partitioned into K portions that each store a respective architectural register of the instruction set architecture, where K is a power of two and is a positive integer.

12. The method of claim 7, further comprising:
loading a state of a thread that has run on a second processor core with a smaller maximum vector length than the processor core into registers of the processor core, including the vector register; and
continuing execution of the thread using the processor core in the second mode to emulate a maximum vector length equal to the maximum vector length of the second processor core.

13. The method of claim 7, further comprising:
selectively routing data of a portion of the operand buffer in the vector execution unit to one of multiple disjoint portions of the vector register corresponding to a respective architectural register stored in the vector register.

14. The method of claim 7, in which the instruction set architecture is a RISC-V instruction set architecture.

15. A non-transitory computer readable medium comprising a circuit representation that, when processed by a computer, is used to program or manufacture an integrated circuit comprising:
a data store configured to store a vector length parameter;
a processor core including:
a vector register;
a vector execution unit comprising an operand buffer, wherein the vector register and the operand buffer have a same length in bits; and
one or more multiplexors configured to selectively route data of a first architectural register stored in a first portion of the vector register to one of multiple disjoint portions of the operand buffer based on an identity of a second architectural register providing a second operand for an instruction being executed;

wherein the processor core is configured to:

while a first value of the vector length parameter is stored in the data store, store a single architectural register of an instruction set architecture in the vector register; and while a second value of the vector length parameter is stored in the data store, store multiple architectural registers of the instruction set architecture in respective disjoint portions of the vector register.

16. The non-transitory computer readable medium of claim 15, wherein the vector register is of length N bits and the vector execution unit is connected to the vector register by a datapath of width N bits, wherein N is a positive integer.

* * * * *